(12) United States Patent
Meadow et al.

(10) Patent No.: US 9,315,240 B2
(45) Date of Patent: Apr. 19, 2016

(54) MAGNETIC DRAG VESSEL SLOWING METHOD AND APPARATUS

(71) Applicants: Rachel E. Meadow, Jacksonville, FL (US); William D. Meadow, Jacksonville, FL (US)

(72) Inventors: Rachel E. Meadow, Jacksonville, FL (US); William D. Meadow, Jacksonville, FL (US)

( * ) Notice: Subject to any disclaimer, the term of this patent is extended or adjusted under 35 U.S.C. 154(b) by 0 days.

(21) Appl. No.: 14/666,547

(22) Filed: Mar. 24, 2015

(65) Prior Publication Data

US 2015/0191221 A1 Jul. 9, 2015

Related U.S. Application Data

(63) Continuation of application No. 13/950,126, filed on Jul. 24, 2013, now Pat. No. 9,003,996.

(60) Provisional application No. 61/675,326, filed on Jul. 24, 2012.

(51) Int. Cl.
*B63B 21/48* (2006.01)
*B63B 21/02* (2006.01)
*B63H 25/50* (2006.01)
*B63G 6/00* (2006.01)
*B63B 1/32* (2006.01)

(52) U.S. Cl.
CPC ............. *B63B 21/48* (2013.01); *B63B 21/02* (2013.01); *B63H 25/50* (2013.01); *B63B 2001/327* (2013.01); *B63G 6/00* (2013.01)

(58) Field of Classification Search
CPC ............................ B63B 21/02; B63B 21/48
USPC ........................................ 114/293, 294, 311
See application file for complete search history.

(56) References Cited

U.S. PATENT DOCUMENTS

| | | | | |
|---|---|---|---|---|
| 3,459,151 A | * | 8/1969 | Chiba | B63B 21/48 114/311 |
| 3,472,195 A | * | 10/1969 | Chiba | B63B 21/48 114/311 |
| 9,003,996 B2 | * | 4/2015 | Meadow | B63B 21/48 114/294 |

* cited by examiner

*Primary Examiner* — Lars A Olson
(74) *Attorney, Agent, or Firm* — Joseph Kincart; Ideation Law, PLLC

(57) ABSTRACT

The present invention of MagDrag relates to methods and apparatus of a magnetic hull attaching sea anchors to slow down and impair the forward motion of sea vessels. The basic MagDrag device includes four major components, a large magnet, a pump, a sea anchor bag and a buoy.

15 Claims, 6 Drawing Sheets

MAGNETIC DRAG VESSEL SLOWING METHOD AND APPARATUS

CROSS REFERENCE TO RELATED APPLICATIONS

This application claims priority to U.S. patent application Ser. No. 13/950,126, filed Jul. 24, 2013, entitled "MAGNETIC DRAG VESSEL SLOWING METHOD AND APPARATUS" as a continuation application. The U.S. patent application Ser. No. 13/950,126, in turn claims priority to U.S. Provisional Patent Application Ser. No. 61/675,326 filed, Jul. 24, 2012 and entitled, "MagDrag Vessel Slowing Buoys". The contents of each are relied upon and hereby incorporated by reference.

BACKGROUND

The history of the sea based transport from harbors and across the high seas includes passive methods and apparatuses intended to stop ships or at least impede the rapid proceeding of a ship under way.

Examples of methods for impeding passage of a ship underway include buoyant and semi-buoyant mines that have been used to blow holes in ships and sink them. In other examples, nets, chains and ropes have been employed at harbor entrances or restricted waterway to stop and ensnare propellers and rudders of sea going vessels. Still other examples include ensnaring cables around a ship propeller to impede the propeller from turning from operating at full speed and perhaps stalling the engines all together.

Some known technologies such as U.S. Pat. No. 8,245,617 (the '617 Patent) described methods of deploying immobilization devices that use sticky tendrils to ensnare land or water borne vehicles. The '617 Patent was based upon an entangling device including a drag chute that is dragged by a vessel and illustrates the entangling device being entangled on the propeller. The principle method of attachment described by the '617 Patent is based on "entanglement".

In addition, the method described in 617 assumed the "immobilization" would come from the "entangling apparatus" which is intended to "foul or render a large prop". The apparatus included a "drag chute" connected to a "strap" which implies the tension or drag from the "drag chute" is not the principal modality of slowing the vessel. A "strap" is generally known to be made of cloth or flexible material and not generally known to be strong nor as the principle method by which the vessel is slowed.

The methods listed above, tend to be destructive to the ships involved and also expensive both in the deployment of the apparatus and the damage to the ship and perhaps harm to a crew on a ship impacted by such devices.

The need therefore remains for apparatus and methods to enable large-scale and low-cost deployment of non-lethal ship-slowing technology to impede normal passage of a ship underway.

SUMMARY OF THE INVENTION

Accordingly, the present invention provides methods and apparatus for impeding the passage of a ship underway. The present invention includes an apparatus and a method by which a drag device attaches to the hull of a ship via a ship attachment mechanism, such as for example a powerful magnet. The ship attachment mechanism in turn is connected to a drag device that slows the movement of ship underway. One example of a drag device includes a self inflating sea anchor. A self inflating sea anchor may be deployed, for example via a similar mechanism as an airbag is deployed in a motor vehicle.

A basic magnetic attachment and drag impediment device "MagDrag device" may include three major components, a large magnet, a sea anchor bag and a buoy. The buoy provides floatation for heavier than water components including the attachment magnet and sea anchor bag.

In some embodiments, as a seagoing vessel passes over and impacts a MagDrag apparatus, the float will drag along or under the hull as the seagoing vessel moves by, turbulence, the magnetic plate will tumble and eventually come close to and attach tightly to the hull and then the sea anchor will inflate due to the forward motion of the seagoing vessel. At that time the buoy's attachment ring which is loosely attached to the magnet and sea anchor will tear away and float to the surface in the wake of the moving sea going vessel.

BRIEF DESCRIPTION OF THE DRAWINGS

The invention will be described in detail with reference to certain preferred embodiments thereof and accompanying drawings where.

DETAILED DESCRIPTION OF THE INVENTION

As described herein and specifically defined by the claims below, the present invention describes methods and apparatus for impeding the passage of a ship underway. Generally drag device attaches to the hull of a ship via a ship attachment mechanism and slows the ship movement due to a drag effect created by the attached drag device. The attachment mechanism may include, for example, a powerful magnet that attaches via magnetic force to the hull of a steel ship. The ship attachment mechanism in turn is connected to a drag device that slows the movement of the ship while underway.

One example of a drag device includes a self inflating sea anchor. A self inflating sea anchor may be deployed, for example via a similar mechanism as an airbag is deployed in a motor vehicle. Once attached to the hull of a ship and deployed, the sea anchor creates increased drag on the ship hull and slows ship movement.

When a seagoing vessel passes over the MagDrag apparatus, the float will drag along the side of or under the hull as the vessel moves by, with the turbulence, the magnetic plate will eventually come close to and attach tightly to the hull and then the sea anchor will inflate due to the forward motion of the seagoing vessel. Additional sea anchor opening timers, quick setting pressure activating glues, GPS encoding transmitters will enable a wide variety of non-lethal options for implementing various shipping impairment strategies.

Figure 1:
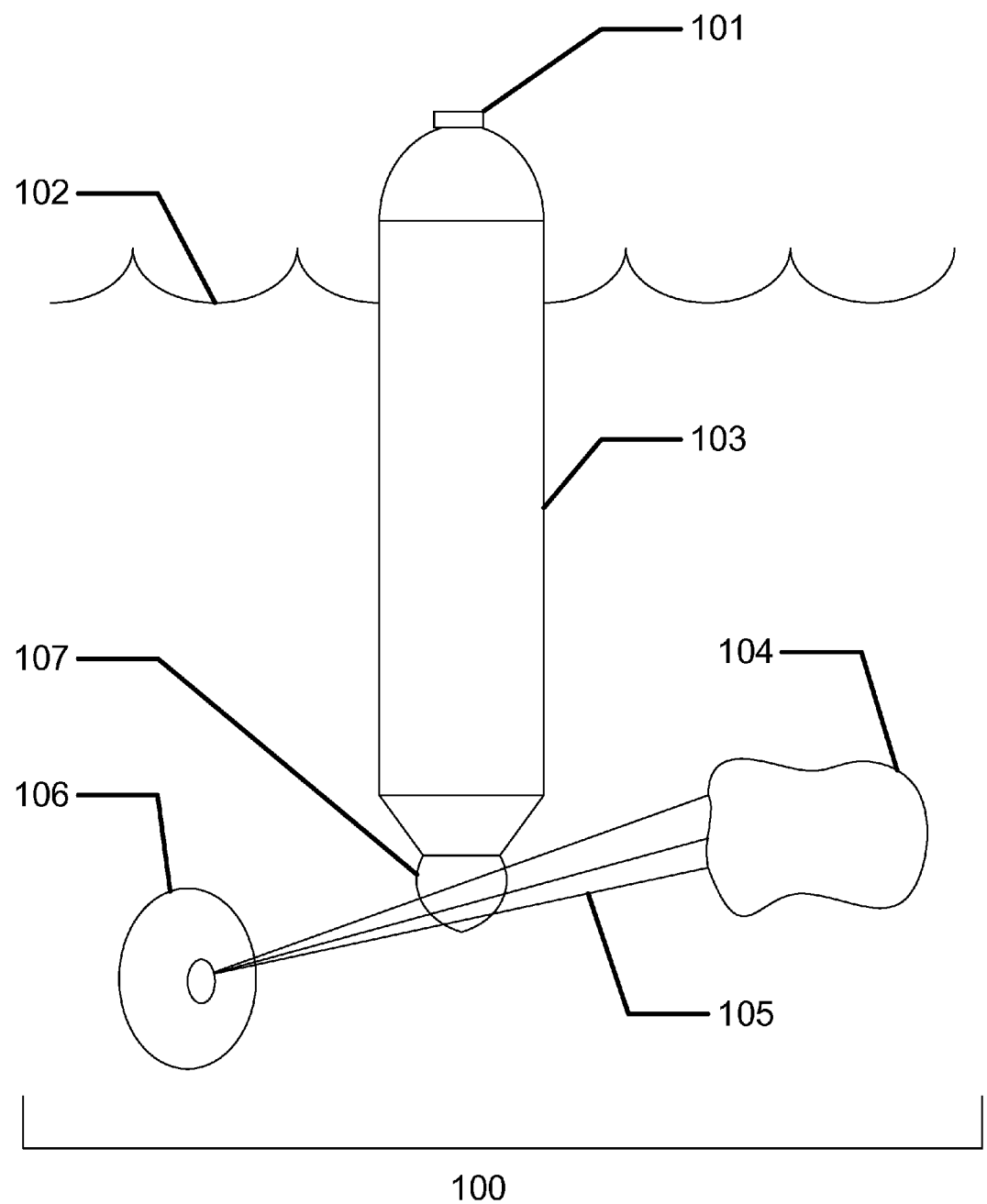
FIG. 1 illustrates a MagDrag apparatus in accordance with some embodiments of the present invention.

Referring now to FIG. 1, a MagDrag apparatus 0100 in accordance with some embodiments of the invention is illustrated. The MagDrag apparatus 0100 as illustrated utilizes a set of components that include: one or more buoys 0103, a buoy relief valve (with optional beacon) 0101, a sea anchor 0104, such as, for example a self inflating bag. In some embodiments the self inflating bag may include an expanding gas. In other embodiments, a self inflating bag may include a bag with a pump for pumping sea water into the bag and thereby inflate the bag with sea water. The mass of the sea water increases a drag effect on the ship.

In some embodiments, one or more sea anchor to buoy connector rods 0105 are used to connect the sea anchor to an attachment device, such as, for example, a magnetic plate (with optional wet curing glue surface) 0106 and attachment ring 0107.

These components assembled as illustrated may be designed to float at a low level above the sea wave surface 0102 by adjusting a relief valve 0101. The sea anchor bag 0104 is attached to the magnetic plank by plurality of steel rods 0105. The attachment ring 0106 allows the sea anchor bag 0104 and the magnetic plate 0106 to remain attached to the buoy 0103 until the magnetic plate attaches magnetically to the hull of an oncoming ship 0200.

The sequence of how a MagDrag apparatus 0100 is attached to a seagoing vessel hull 2101 is illustrated in FIGS. 2, 3, 4, 5, 6. The temporal sequence of the figures may be dependent upon several factors including, by way of example, ship speed and wave height. Generally the process from t=1 to t=4 may be anywhere from a few seconds to tens of seconds.

The MagDrag apparatus 0100 may be impacted by a hull of a sea going vessel and then become fixedly attached via the magnetic attraction of the attachment mechanism to the steel hull of the ship.

Figure 2:
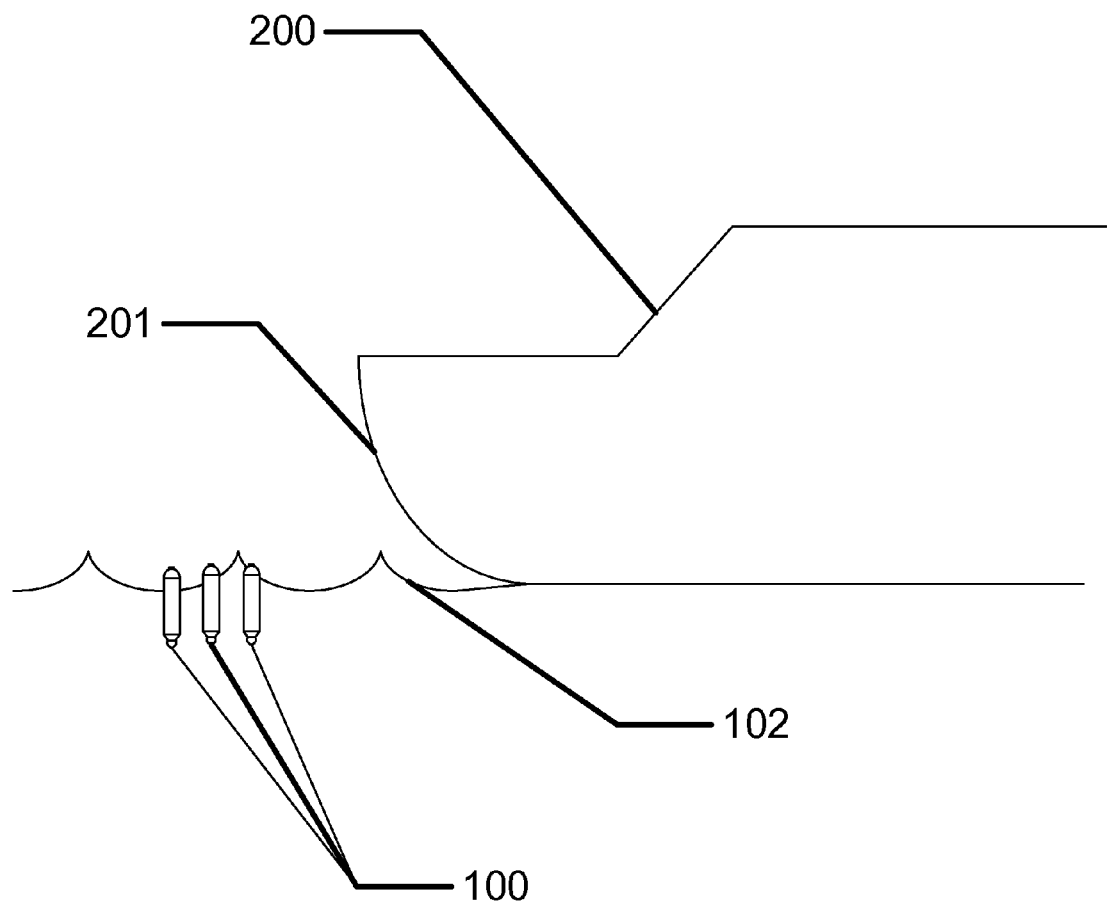
FIG. 2 illustrates the initial deployment of multiple apparatus in front of an oncoming vessel.

Referring now to FIG. 2 an initial phase includes deployment of a plurality of MagDrags 0100 at t=0 when the MagDrags 0100 are deposited in the ocean, or other waterway in the path of an oncoming ship or other seagoing vessel 0200.

Figure 3:
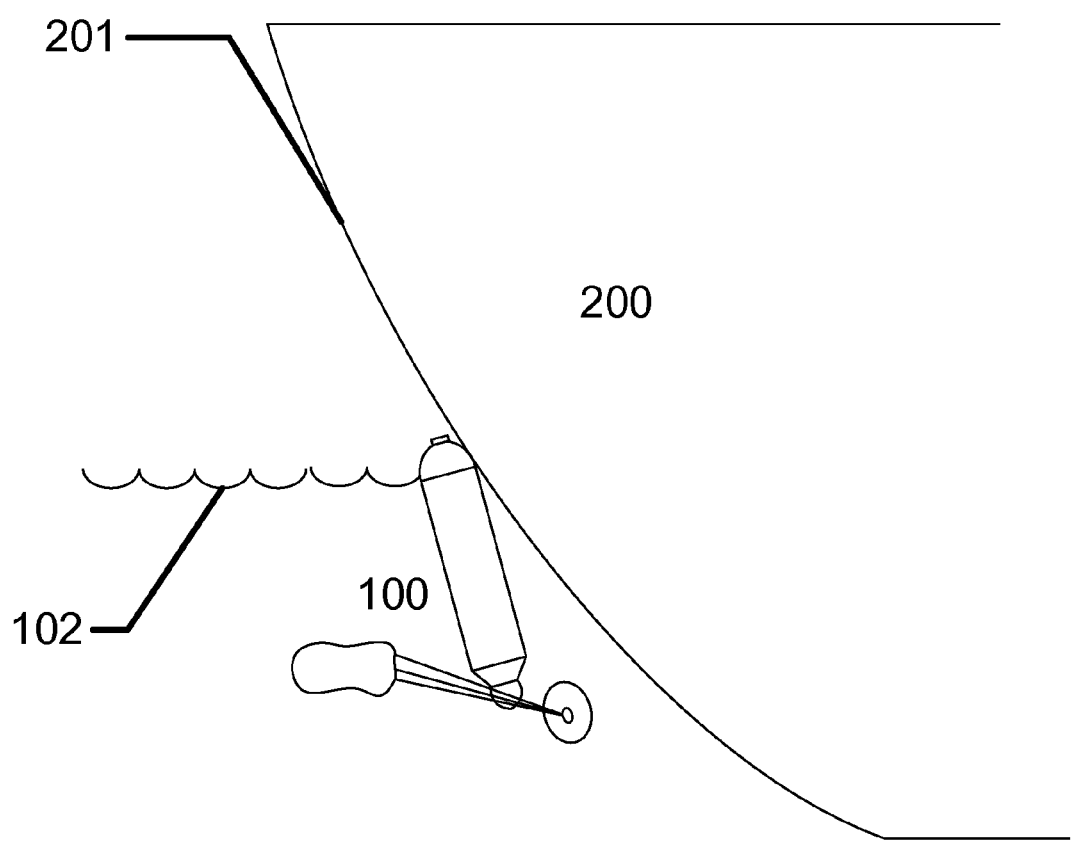
FIG. 3 illustrates the initial impact of a vessel with a MagDrag apparatus.

Referring now to FIG. 3 an initial impact of apparatus 0100 with the hull 0201 of the oncoming vessel 0200 at t=1 allows for the apparatus 0100 to engage the vessel 0200.

Figure 4:
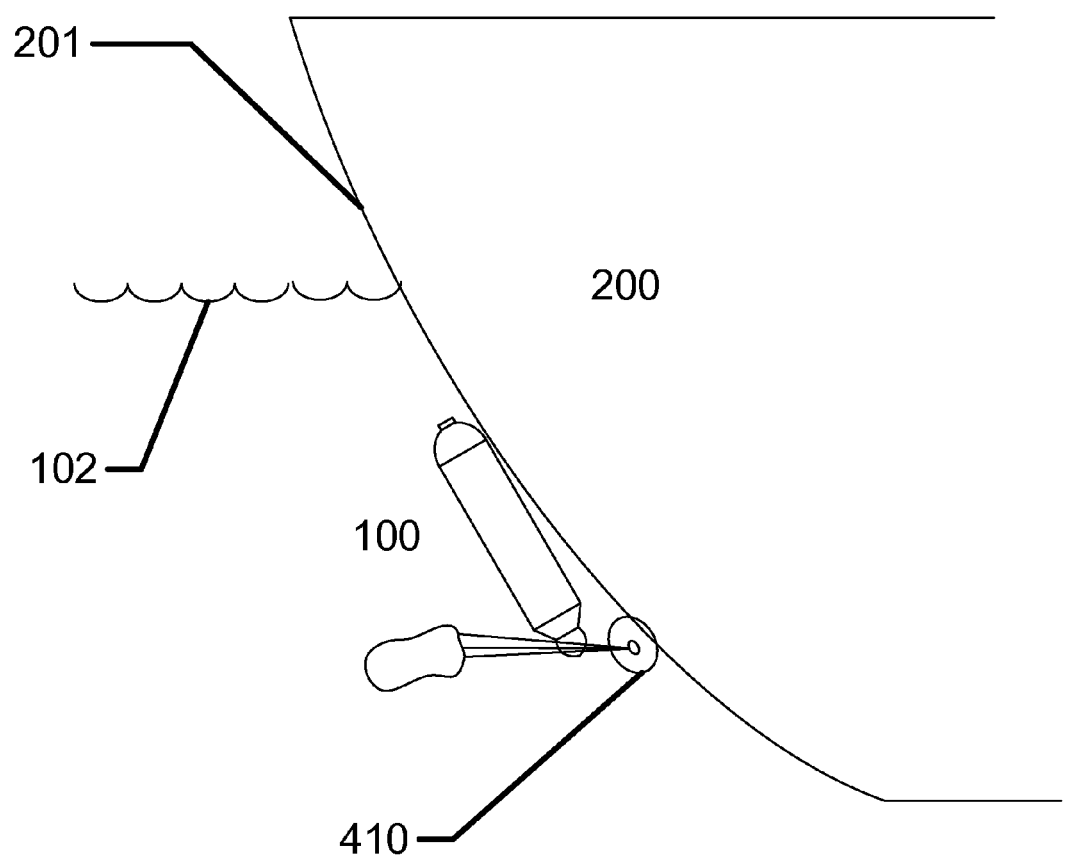
FIG. 4 illustrates how the MagDrag is pushed under the vessel hull.

Referring now to FIG. 4, an illustration of the process at t=2 shows when the bow of the vessel's hull 0201 traverses over the MagDrag 0100 is pushed underneath the sea surface waves 0102. This turbulent movement eventually brings Magnetic Plate 106 closer to steel hull of the ship 0201 and at some point in time, the magnetic attraction 0410 of the magnetic plate 0105 comes close enough to be attracted to and fixedly self attach itself to the steel hull 0201.

Figure 5:
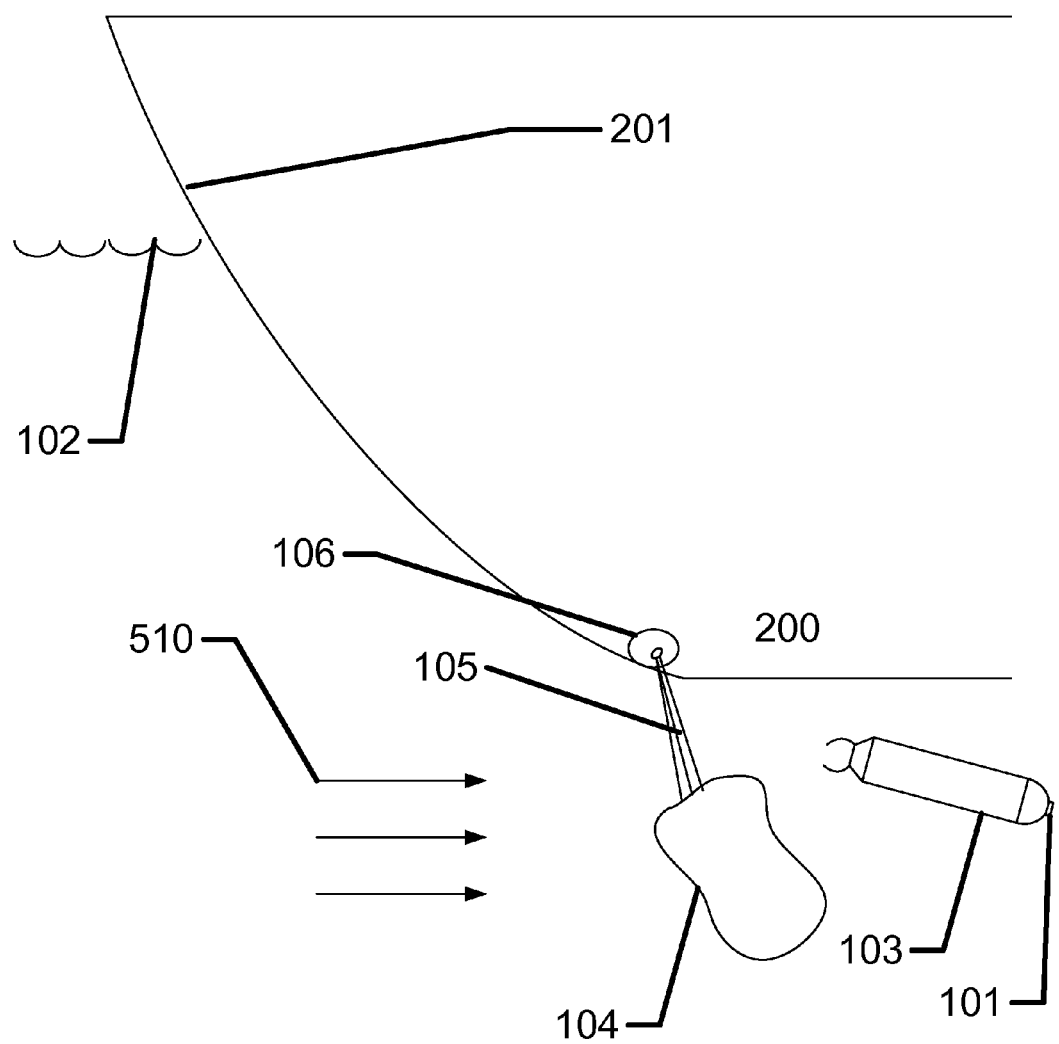
FIG. 5 illustrates how the MagDrag plate is attached to the vessel hull.

Referring now to FIG. 5, at t=3 the magnetic plate 0106 connects to the steel hull 0201, and the attachment ring 0107 of the buoy 103 is broken by the stress induced by ships 0200 movement and water flow 0510 across the MagDrag apparatus.

Figure 6:
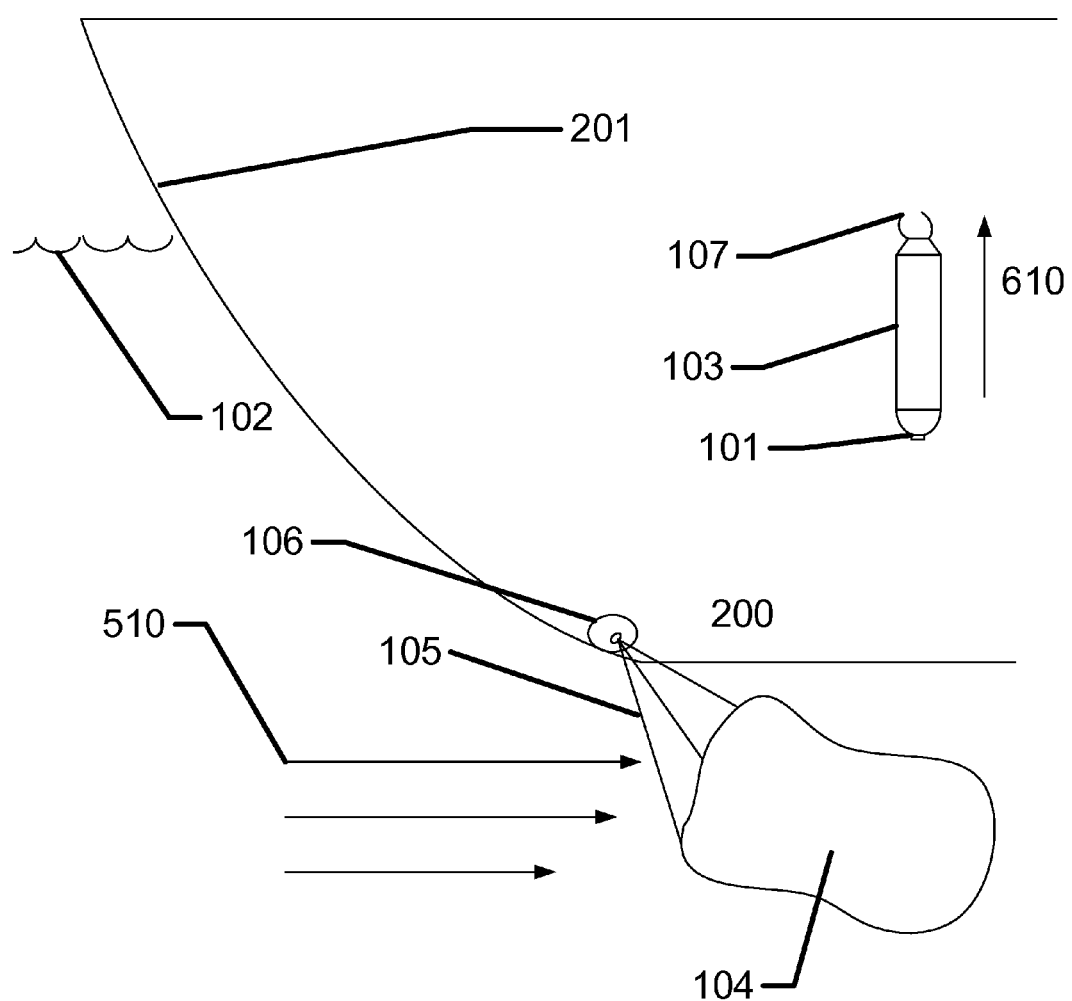
FIG. 6 illustrates how the MagDrag attachment ring snap releases the buoy after attaching to vessel hull.

Referring now to FIG. 6, at t=4 the ships 0200 movement allows for attachment rods 0105 to spread open and inflate the sea anchor bag 0104 as it is filled with oncoming water 0510. Because the buoy 103 is detached with released attachment ring 0107 from the rest of the Mag Drag apparatus components, its lighter weight causes the buoy 0103 to float 0610 to the surface. Once the buoy re-surfaces, the active beacon signal mounted on the relief valve would be detectable.

In some embodiments, a glue may further facilitate attachment initiated by magnetic attachment to the hull. In some embodiments, a permanent magnet may be included in the attachment mechanism, in other embodiments; an electromagnetic magnet may be used. In order to conserve energy, some embodiments may include an activation circuit that powers the electromagnet once the buoy is impacted by the ship. The electromagnetic effect will attach the attachment mechanism to the Hull of the ship and a glue will make the attachment more permanent.

The present invention may therefore include a relatively low cost for the MagDrag device and allows for reasonable expense for deploying a plurality of devices, including in some embodiments, mass deployment of MagDrags in a mouth of a harbor or other limited passage areas for ships.

In some embodiments a variable length anchoring system as described in U.S. Pat. No. 7,179,145 may be used in conjunction with the basic MagDrag to allow for large scale deployment of more precisely positioned MagDrags in areas with large depth variations. MagDrag sea floor anchors do not need to be as precise as this 0145 contemplates for the apparatus to effectively accomplish its intended use.

In some embodiments, a sea floor anchor that digs into sand of fixed or variable may be attached to the MagDrag to keep MagDrags in position irrespective of currents and tides for long periods of time until such time as a vessel may impact it.

In some embodiments, a post impact timer built into the attachment ring would for the opening of the attachment ring would enable wet curing glue on the magnetic plate to harden then the attachment ring releases so that the closed and parallel aligned attachment rods would spread open and the sea anchors semi porous material such as canvas would self-inflate.

In some embodiments, the attachment ring could be any form of many types of connectors that hold components together such as latches, pins, bands, clamps, etc.

In some embodiments, if the apparatus is not impacted by the targeted vessel, a delay timer and visual beacon or GPS encoding radio mounted on top of the relief valve will enable the easy retrieval of MagDrags to be retrieved and not adversely encounter unintended vessels.

In some embodiments, the relief value can be configured to open based on a timer so that it can fill with water and sink the entire apparatus to avoid becoming a problem for shipping operations.

In some embodiments, hull penetrating mechanisms could be added to the apparatus to improve its ability to strongly adhere to the surface of the vessel. These include but are not limited to using tiny explosive charges to penetrate the hull surface with nails to secure tighter than the magnet alone and enable the deployment of larger sized sea anchors.

The invention will enable small vessels to deploy large quantities of an apparatus that will slow down shipping operations from a harbor or port in a non-lethal manor as well as on the open seas to impede the forward progress of larger fishing vessels that are currently employed to catch marine life.

In still another aspect, in some embodiments, a propulsion device replaces the buoy 0103 or is incorporated into the buoy 0103. The propulsion device 0103 essentially includes an unmanned water vehicle that may be deployed using well known propulsion and control systems, such as for example a battery powered propeller and rudder controlled via radio control. An operator may use the radio control to control the propulsion device and rudder and steer the MagDrag device 0100 into contact with the ship. More elaborate systems may use automated detection systems included on the MagDrag 0100 that sense a ship in proximity and then propel the MagDrag into contact with the ship.

What is claimed is:

1. Apparatus for attaching a sea anchor to a ship, the apparatus comprising:
a buoyancy device for supporting a magnetic plate and an inflatable sea anchor while placed in water;

a magnetic plate attached to the buoyancy device and supported by the buoyancy device while the magnetic plate and the inflatable sea anchor are in water; and a pump for pumping sea water into the inflatable sea anchor and thereby inflate the inflatable sea anchor with sea water such that when a vessel comprising a steel hull impacts the buoy, the magnetic plate becomes fixedly attached to the steel hull and the inflatable sea anchor provides drag on the steel hull.

2. The apparatus of claim 1 wherein the magnetic plate additionally comprises a layer of wet curing adhesive that is activated upon impact with the hull.

3. The apparatus of claim 2 wherein the sea anchor remains closed until the wet curing adhesive has cured with a timer that activates a release of attachment rods to enable the sea anchor to open.

4. The apparatus of claim 1 wherein the sea anchor is attached to the magnetic plate via one or more steel connectors.

5. The apparatus of claim 1 wherein the sea anchor is attached to the magnetic plate via one or more nylon cables.

6. The apparatus of claim 1 where the buoy has a tear away attachment post impact that allows the buoy to float to a surface of water.

7. The apparatus of claim 1 where the buoy has a tear away attachment post impact that causes the buoy to rip open and sink.

8. The apparatus of claim 1 wherein the anchor of a predetermined length is attached to the apparatus.

9. The apparatus of claim 1 wherein the buoy comprises a Global positioning Satellite device and radio position transmitter.

10. The apparatus of claim 1 wherein the sea anchor comprises one or more gas inflatable bag.

11. The apparatus of claim 1 wherein the sea anchor comprises a water inflatable bag and a pump for pumping water into the bag.

12. A method for deploying the apparatus of claim 1, the method comprising the steps of:

placing the apparatus for attaching a sea anchor to a ship in an spaced pattern in a water channel conducive to allow for impact of the apparatus against a hull of a traversing vessel; and pumping water into the inflatable sea anchor.

13. The method of claim 12 additionally comprising the step of separating the buoy from the magnetic plate and floating the buoy to a surface of water in which the buoy is located.

14. The method of claim 12 additionally comprising the step of separating the buoy from the magnetic plate and sinking the buoy to the bottom when the magnetic plate attaches to the steel hull while moving.

15. The method of claim 12 additionally comprising the step of deflating the sea anchor by allowing water pumped into the inflatable sea anchor to exit the sea anchor.

* * * * *